United States Patent
Han et al.

(10) Patent No.: US 9,784,335 B1
(45) Date of Patent: Oct. 10, 2017

(54) HYDRAULIC ENGINE MOUNT FOR VEHICLE

(71) Applicant: Hyundai Motor Company, Seoul (KR)

(72) Inventors: Sang-Hoon Han, Gyeonggi-do (KR); Jae-Hyung Yun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/214,719

(22) Filed: Jul. 20, 2016

(30) Foreign Application Priority Data

Apr. 6, 2016 (KR) ........................ 10-2016-0042032

(51) Int. Cl.
| | |
|---|---|
| F16F 5/00 | (2006.01) |
| F16F 13/10 | (2006.01) |
| B60K 5/12 | (2006.01) |
| F16F 13/26 | (2006.01) |

(52) U.S. Cl.
CPC .......... F16F 13/107 (2013.01); B60K 5/1208 (2013.01); F16F 13/10 (2013.01); F16F 13/26 (2013.01); F16F 13/262 (2013.01); *F16F 2230/186* (2013.01)

(58) Field of Classification Search
CPC .......... F16F 13/26; F16F 13/262; F16F 13/08; F16F 13/10; F16F 13/105
See application file for complete search history.

(56) References Cited

U.S. PATENT DOCUMENTS

| | | | | |
|---|---|---|---|---|
| 4,681,306 A | * | 7/1987 | Hofmann .............. | F16F 13/262 188/139 |
| 4,754,956 A | * | 7/1988 | Barone ................. | F16F 13/262 137/625.32 |
| 4,834,349 A | * | 5/1989 | Arai ...................... | F16F 13/262 180/312 |
| 4,905,955 A | * | 3/1990 | Brizzolesi .............. | F16F 13/26 248/636 |
| 5,209,460 A | * | 5/1993 | Bouhours ............. | F16F 13/262 267/140.13 |
| 2003/0151179 A1 | * | 8/2003 | Tewani ................. | F16F 13/262 267/140.15 |

FOREIGN PATENT DOCUMENTS

| | | |
|---|---|---|
| JP | 07-113439 B2 | 12/1995 |
| JP | 09-242811 A | 9/1997 |

(Continued)

*Primary Examiner* — Nicholas J Lane
(74) *Attorney, Agent, or Firm* — Mintz Levin Cohn Ferris Glovsky and Popeo, P.C.; Peter F. Corless

(57) ABSTRACT

An engine mount includes a nozzle plate mounted between an insulator and a diaphragm so as to divide an interior into an upper liquid chamber and a lower liquid chamber, and an annular flow path formed in the nozzle plate so that an encapsulated hydraulic liquid flows between the upper liquid chamber and the lower liquid chamber, the nozzle plate being opened at an upper side of the flow path; a shielding member which has two or more shielding plates arranged to cover the upper side of the flow path; an adjusting bolt which is rotatably mounted in a core coupled to the insulator; and a connector, in which the shielding plates are folded or unfolded in accordance with a rotation of the adjusting bolt, and a size of an upper flow path hole is determined depending on a state in which the shielding plates are folded or unfolded.

8 Claims, 6 Drawing Sheets

(56) References Cited

FOREIGN PATENT DOCUMENTS

| KR | 10-0192484 B1 | 6/1999 |
| KR | 10-0569444 B1 | 4/2006 |
| KR | 2007-0034691 A | 3/2007 |
| KR | 2009-0049314 A | 5/2009 |
| KR | 10-1382452 B1 | 4/2014 |

* cited by examiner

HYDRAULIC ENGINE MOUNT FOR VEHICLE

CROSS-REFERENCE TO RELATED APPLICATIONS

This application claims under 35 U.S.C. §119(a) the benefit of Korean Patent Application No. 10-2016-0042032, filed on Apr. 6, 2016 in the Korean Intellectual Property Office, the entire contents of which are incorporated by reference herein.

BACKGROUND

1. Technical Field

The present invention relates to a hydraulic engine mount in which an interior is divided by a nozzle plate into an upper liquid chamber and a lower liquid chamber, and an encapsulated hydraulic liquid flows between the upper liquid chamber and the lower liquid chamber through a flow path formed in the nozzle plate, and more particularly, to an engine mount capable of tuning and customizing damping characteristics by changing a length of the flow path even after the engine mount is mounted.

2. Description of the Related Art

An engine for a vehicle is installed in an engine room of a vehicle body through an engine mount in order to insulate or attenuate vibration of the engine, and a rubber mount for insulating and attenuating vibration using elastic force of rubber and a hydraulic engine mount in which a predetermined amount of a hydraulic liquid is encapsulated are widely used for a passenger vehicle.

Among the mounts, the hydraulic engine mount has a structure in which a predetermined amount of hydraulic liquid is encapsulated therein and vibration is attenuated by a flow of the hydraulic liquid, and has an effect of simultaneously attenuating vibration in a high frequency region and a low frequency region, such that a range of application of the hydraulic engine mount is increased.

As illustrated in FIG. 1, the hydraulic engine mount has a structure in which an insulator 4 made of an elastic material is coupled at an upper side inside a case, a diaphragm 5 is coupled at a lower end, a nozzle plate 6 is mounted between the insulator 4 and the diaphragm 5, and an internal space is divided into an upper liquid chamber and a lower liquid chamber.

The nozzle plate 6 is configured by coupling a nozzle lower portion 9 and a nozzle upper portion 7. The nozzle lower portion 9 has a doughnut shape having a hole formed at a center thereof, and has a structure in which an annular flow path groove, which constitutes a lower portion of a flow path, is formed along an outer circumference of the central hole. A lower flow path hole is formed in a bottom surface at one end of the flow path groove so as to communicate with the lower liquid chamber.

A membrane 8 (which vibrates when the hydraulic liquid flows) and the nozzle upper portion 7, which is formed in a ring shape so as to prevent the membrane 8 from being separated, are sequentially at a center above the nozzle lower portion 9. An upper flow path hole is formed in the nozzle upper portion 7 so as to be connected to the other end of the flow path groove and to communicate with the upper liquid chamber.

That is, the upper side of the flow path groove is closed by the nozzle upper portion 7, and as a result, a 'flow path' through which the hydraulic liquid may flow is formed in the nozzle plate 6. Therefore, one side of the flow path communicates with the upper liquid chamber through the upper flow path hole, and the other side of the flow path communicates with the lower liquid chamber through the lower flow path hole.

Therefore, the hydraulic liquid flows through the flow path as an internal volume of the upper liquid chamber is increased or decreased when a bolt 1 connected with an engine (not illustrated) is mounted and the insulator 4 coupled to a core 3 (which moves in accordance with vibration and movement of a load transmitted from an engine) is elastically deformed. For reference, the bolt 1 is sometimes manufactured integrally with the core 3, but as illustrated, a bolt hole 2 is formed in the core 3, threads are formed on a head of the bolt 1, and the bolt 1 and the core 3 are fastened in a threaded connection manner.

Meanwhile, at the time of developing an engine mount, the engine mount is designed in consideration of ride quality and handling (ride & handling) and NVH (noise, vibration, harshness) performance, and a damping frequency is frequently required to be changed during developing, evaluating, and producing steps.

That is, an engine mount needs to be constantly tuned from a step of initially developing a vehicle until the vehicles are mass-produced. In particular, significant amounts of time and costs are required, and considerable losses of time and costs occur when a mold for mass-production is required to be changed after the mold for mass-production is initially made.

A customer, who purchases the vehicle, has various expectations with respect to traveling performance of the vehicle. That is, the customer may have preferences concerning traveling performance of the vehicle or NVH performance. However, there is a problem in that once the engine mount is mounted in a mass-produced vehicle, personal tuning is nearly impossible.

SUMMARY

The present invention provides an engine mount which may be easily tuned as necessary even after the engine mount has been mounted in a mass-produced vehicle.

An exemplary embodiment of the present invention provides an engine mount for a vehicle including: a nozzle plate mounted between an insulator and a diaphragm so as to divide an interior into an upper liquid chamber and a lower liquid chamber, and an annular flow path is formed in the nozzle plate so that an encapsulated hydraulic liquid flows between the upper liquid chamber and the lower liquid chamber, the nozzle plate being opened at an upper side of the flow path; a shielding member which has two or more shielding plates connected so as to be folded or unfolded so that a length of the shielding member is changed, the shielding member being mounted on the nozzle plate so as to cover the upper side of the flow path; an adjusting bolt which is rotatably mounted in a core coupled to the insulator; and a connector which has one end connected to the adjusting bolt, and the other end connected to any one of the shielding plates, in which the shielding plates are folded or unfolded in accordance with a rotation of the adjusting bolt, and a size of an upper flow path hole, which is formed at one side end of the flow path and communicates with the upper liquid chamber, is determined depending on a state in which the shielding plates are folded or unfolded.

The shielding plate may have a shape having a height difference between both sides as a portion of a lower plate having a first catching projection protruding upward at one side end and a portion of an upper plate having a second catching projection protruding downward at the other side end are stacked on each other, and the shielding plates of the shielding member may be connected so as to be slidable relative to each other, and connected such that the sliding movement is restricted when the first catching projection of one shielding plate of the two neighboring shielding plates comes into direct contact with the second catching projection of the other shielding plate.

The connector may be connected to the shielding plate closest to the upper flow path hole, the connector may be made of a material having elasticity, and the connector may have a curved shape so that a curved portion is formed between the adjusting bolt and the shielding plate.

In the exemplary embodiment of the present invention, the nozzle plate may include: a nozzle lower portion which has an annular flow path groove formed in an upper surface of the nozzle lower portion, and a lower flow path hole formed at one side end of the flow path groove and communicating with the lower liquid chamber; and a nozzle upper portion which is coupled at an upper side of the nozzle lower portion, and has an upper flow path hole formed at the other side end of the flow path groove and communicating with the upper liquid chamber, and the shielding member may be slidably coupled to the nozzle upper portion so as to be placed on the flow path groove. That is, the nozzle lower portion according to the present invention may have the same shape as a structure in the related art, but the nozzle upper portion has a structure in which a hole extends to expose the flow path groove at an upper side through the upper flow path hole, and the shielding member may be placed on a portion where the hole extends.

The core may have a bolt hole having threads formed on an inner circumferential surface of the bolt hole, the adjusting bolt may be thread-coupled into the bolt hole, and a wrench groove may be formed at an upper end of the adjusting bolt so that a wrench is fitted into the wrench groove. Further, a fixing bolt for coupling an engine bracket may be fastened into the bolt hole at an upper side of the adjusting bolt.

The present invention having the aforementioned configuration is configured to adjust damping characteristics of the engine mount by changing an overall length of a flow path by adjusting a length of the upper flow path hole, thereby reducing tuning time and costs during a process of developing a vehicle. That is, it is possible to reduce initial investment costs for molds which are incurred due to a change of internal components, and because it is not necessary to replace components, it is possible to reduce time required to manufacture and replace samples.

Even after a vehicle is delivered to a customer, the vehicle may be easily tuned in accordance with the customer's preference, and as a result, it is possible to improve marketability.

DETAILED DESCRIPTION OF THE EMBODIMENTS

Figure 1:
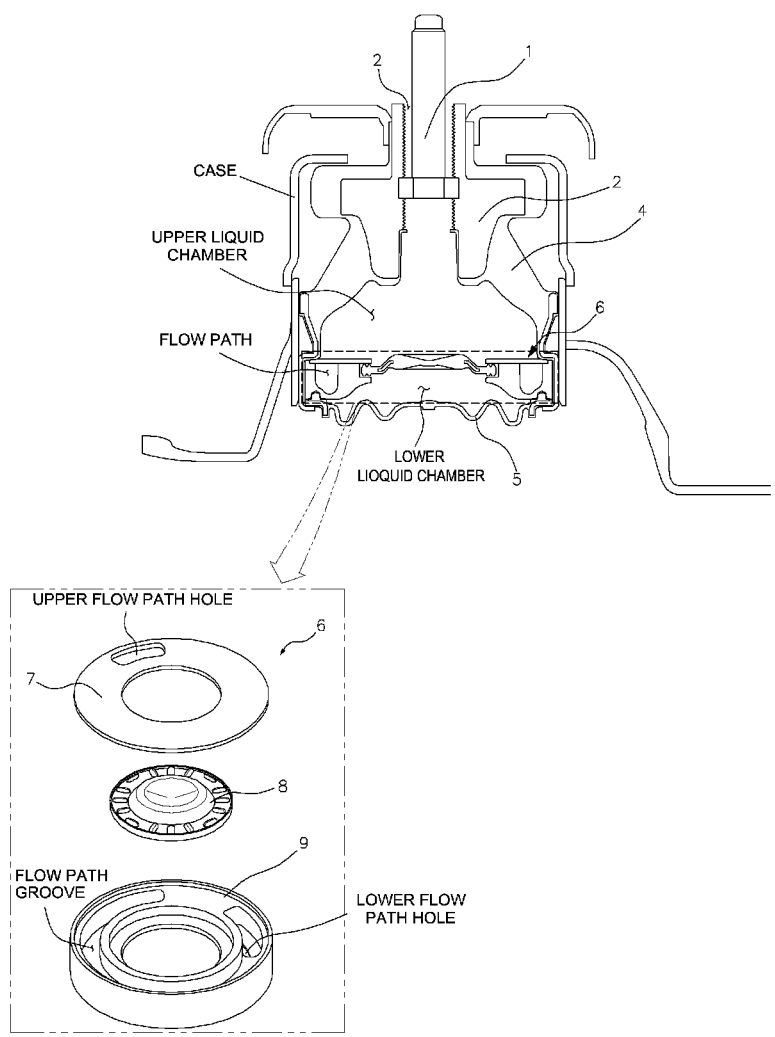
FIG. 1 (RELATED ART) is a view illustrating a state in which a hydraulic engine mount in the related art is cut out in a longitudinal direction, and a state in which a nozzle plate is disassembled.

Hereinafter, the present invention will be described in detail with reference to the accompanying drawings so that those skilled in the technical field to which the present invention pertains may easily carry out the present invention. However, the present invention may be implemented in various different ways, and is not limited to the exemplary embodiment described herein.

A part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an engine mount according to an exemplary embodiment of the present invention will be described in more detail with reference to the drawings.

Figure 2:
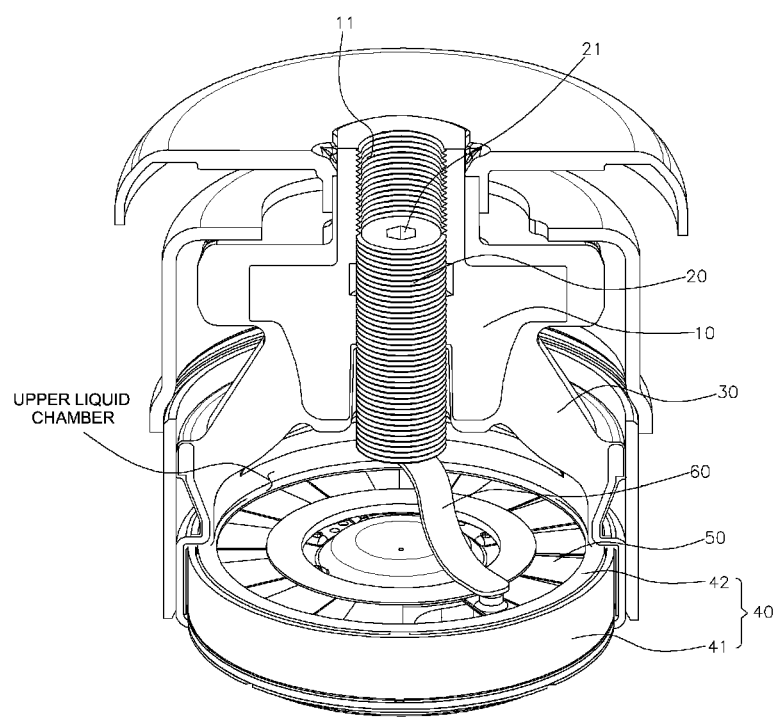
FIG. 2 is a view illustrating a state in which an engine mount according to an exemplary embodiment of the present invention is cut out to show an internal structure of the engine mount.

As illustrated in FIG. 2, the engine mount according to the present invention has a structure in which an insulator 30 made of an elastic material is coupled at an upper side inside a case, a diaphragm (not shown, but similar to the diaphragm 5 described with respect to FIG. 1) is coupled at a lower end, a nozzle plate 40 is mounted between the insulator 30 and the diaphragm, and an internal space is divided into an upper liquid chamber and a lower liquid chamber.

An annular flow path is formed in the nozzle plate 40 so that an encapsulated hydraulic liquid flows between the upper liquid chamber and the lower liquid chamber. Like the configuration in the related art, the nozzle plate 40 is configured by coupling a nozzle lower portion 41 and a nozzle upper portion 42, in which an annular flow path groove is formed in an upper surface of the nozzle lower portion 41, a lower flow path hole, which communicates with the lower liquid chamber, is formed at one side end of the flow path groove, the nozzle upper portion 42 is coupled at an upper side of the nozzle lower portion 41, and an upper flow path hole, which communicates with the upper liquid chamber, is formed at the other side end of the flow path groove. Further, the nozzle upper portion 42 according to the present invention is configured such that the upper flow path hole extends along the flow path groove so that the flow path groove may be exposed at an upper side thereof (or a hole connected with the upper flow path hole additionally extends so that a shielding member may be mounted), and the shielding member is placed on the extending portion.

Figure 3:
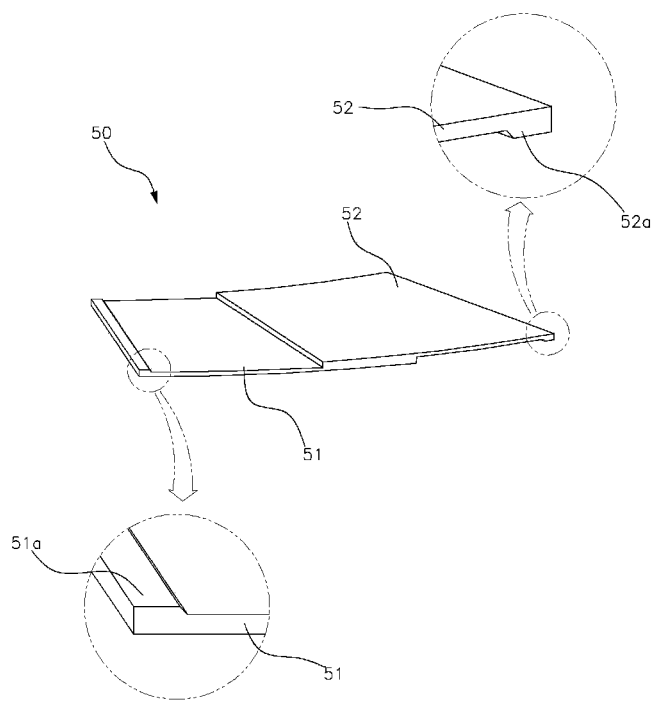
FIG. 3 is a view illustrating a shielding plate according to the exemplary embodiment of the present invention and illustrating a first catching projection and a second catching projection which are partially enlarged, respectively.

The shielding member includes two or more shielding plates 50 which are connected so as to be folded or unfolded so that a length of the shielding member is changed, and the shielding member is mounted on the nozzle upper portion 42 so as to cover an upper side of the flow path. As illustrated in FIG. 3, the shielding plate 50, which constitutes the shielding member, is configured to have a shape having a height difference (a level difference) between both sides as a portion of a lower plate 51 having a first catching projection 51a protruding upward at one side end and a portion of an upper plate 52 having a second catching projection 52a protruding downward at the other side end are stacked on each other.

Figure 4:
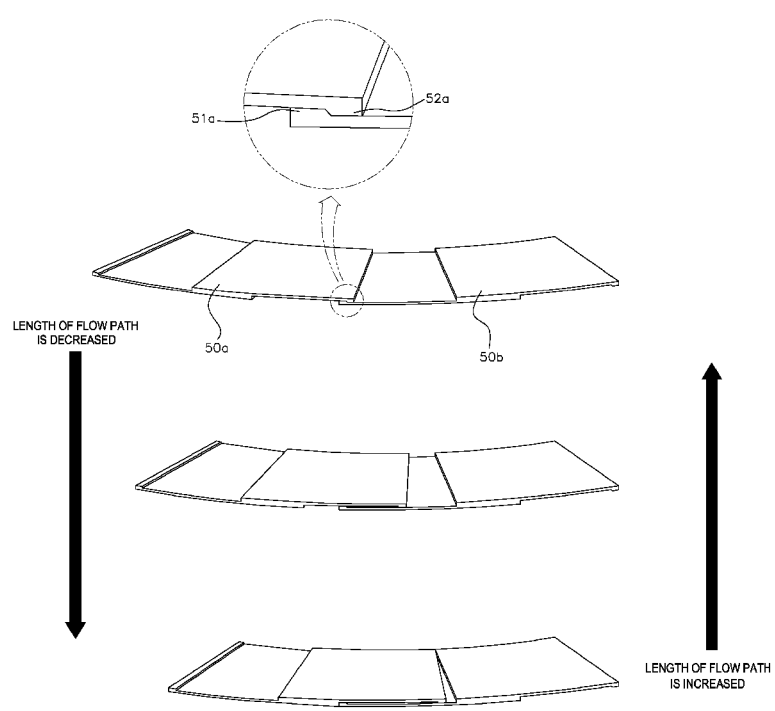
FIG. 4 is a view illustrating a state in which two shielding plates are unfolded (upper drawing) and a state in which the two shielding plates are folded (lower drawing).

As illustrated in FIG. 4, the shielding plates 50 are connected so as to be slidable relative to each other, and connected such that the sliding movement is restricted when the first catching projection 51a of one shielding plate of the two neighboring shielding plates 50 comes into direct contact with the second catching projection 52a of the other shielding plate.

That is, the shielding member may decrease or increase an overall length of the flow path by opening an upper end of the flow path groove.

Further, as illustrated in FIG. 2, a bolt hole 11, which has internal threads formed on an inner circumferential surface thereof in an up and down direction, is formed in a core 10 coupled to the insulator 30, and an adjusting bolt 20 is thread-coupled into the bolt hole 11. The adjusting bolt 20 is mounted such that an upper end thereof is restricted in the bolt hole 11, and a lower end thereof is inserted at a predetermined depth toward the upper liquid chamber.

The other end of a connector 60, which has one end connected to the adjusting bolt 20, is connected to the shielding plate 50 which is closest to the upper flow path hole. Therefore, when the adjusting bolt 20 is rotated, the shielding plates 50 may be folded or unfolded, and a size of the upper flow path hole may be determined depending on a state in which the shielding plates 50 are folded or unfolded.

For reference, the connector 60 may be connected to the shielding plate 50 which is closest to the upper flow path hole, but the connector 60 may be connected to another shielding plate 50. The connector 60 is made of a material having elasticity so that the connector 60 is not deformed by a flow of the hydraulic liquid, and the connector 60 may have a curved shape so that a curved portion is formed between the adjusting bolt 20 and the shielding plate 50.

The adjusting bolt 20 has a wrench groove 21, which is formed at an upper end of the adjusting bolt 20 and has a hexagonal, octagonal, or star shape, so that a wrench may be fitted into the wrench groove 21 and then rotated, and a fixing bolt 70, which couples an engine bracket 80 (connected to an engine), is fastened into the bolt hole 11 at an upper side of the adjusting bolt 20.

Figure 5:
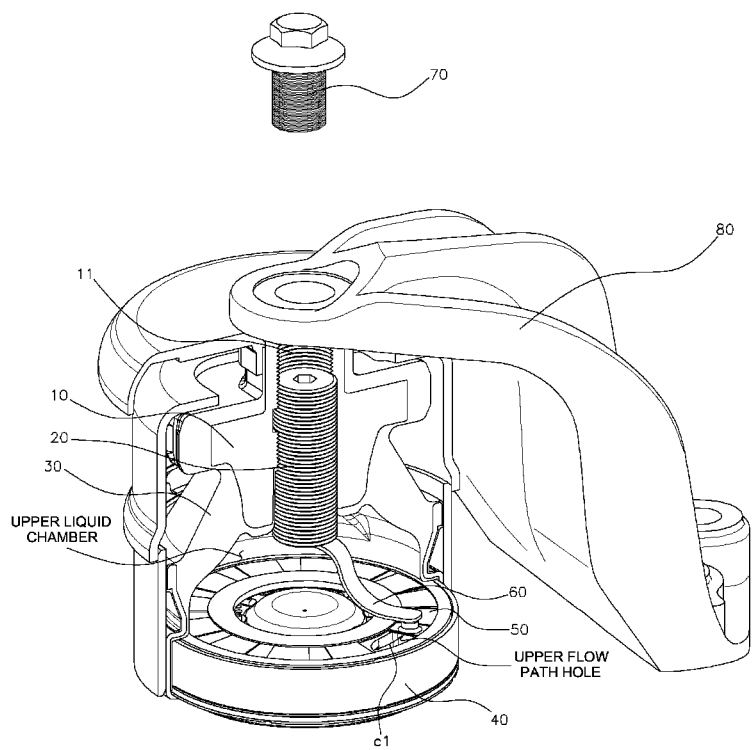
FIG. 5 is a view illustrating a state in which a size $c1$ of an upper flow path hole is relatively small (a length of a flow path is relatively increased).

In the engine mount according to the present invention, which has the aforementioned configuration, when the adjusting bolt 20 is rotated clockwise by the wrench (not shown) in a state in which the fixing bolt 70 is separated, a first shielding plate 50 connected to the connector 60 is rotated and then a second shielding plate, which is adjacent to the right side of the first shielding plate 50, is rotated together with the first shielding plate 50, and when the wrench is further rotated additionally, the sequentially neighboring shielding plates are rotated together (see a sliding structure in FIG. 4). That is, in this case, a size of the upper flow path hole is decreased by c1 as illustrated in FIG. 5, and as a result, a length of the flow path is relatively increased.

Figure 6:
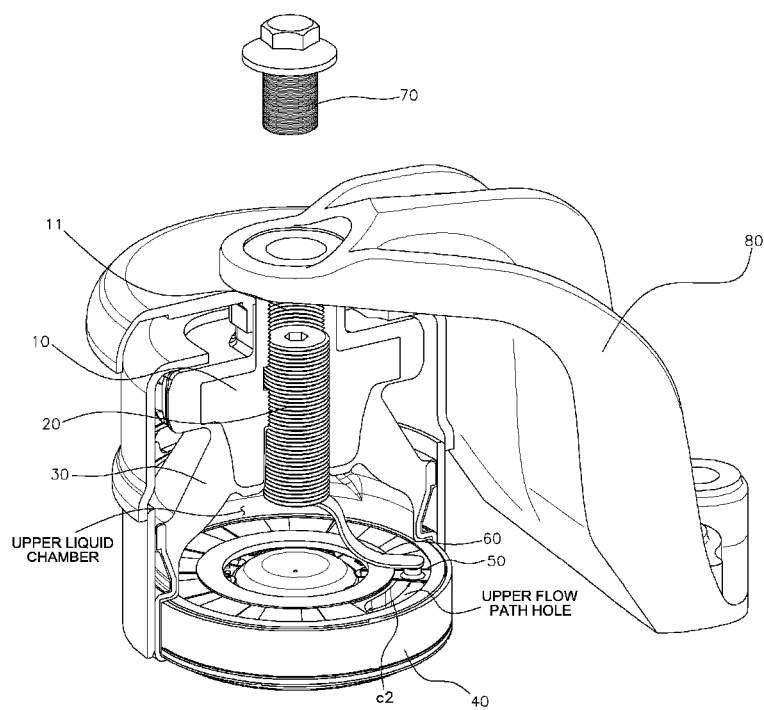
FIG. 6 is a view illustrating a state in which a size $c2$ of the upper flow path hole is relatively large (a length of the flow path is relatively decreased).

In contrast, when the wrench is rotated counterclockwise, the respective shielding plates are sequentially folded, starting with the first shielding plate 50, as illustrated in the lower drawing in FIG. 4, and as a result, a size of the upper flow path hole is increased by c2 as illustrated in FIG. 6, and thus a length of the flow path is relatively decreased.

That is, a factor for determining a damping frequency in the engine mount depends on the following expression.

$$(2\pi f)^2 \propto \frac{C_v A}{\rho l}$$

f: damping peak frequency
$C_v$: volume stiffness
A: cross section of flow path
l: length of flow path
ρ: coefficient of friction of flow path Therefore, when a size of the upper flow path hole is increased, a length of the flow path is relatively decreased such that a damping peak frequency may be moved to a higher frequency region, and when a size of the upper flow path hole is decreased, a length of the flow path is relatively increased such that a damping peak frequency may be moved to a lower frequency region. In addition, dynamic spring characteristics correspond to damping force, and as a result, the engine mount may be tuned to have an appropriate numerical value between ride characteristics and damping characteristics which are contrary to each other (so as to conform to vehicle design or in accordance with a driver's preference).

The present invention having the aforementioned configuration may adjust damping characteristics of the engine mount by changing an overall length of the flow path by changing a length of the upper flow path hole, and as a result, it is possible to easily set insulation characteristics after the sale as well as during a designing step.

The present invention, which has been described above, is not limited by the aforementioned exemplary embodiment and the accompanying drawings, and it is obvious to those skilled in the art to which the present invention pertains that various substitutions, modifications and alterations may be made without departing from the technical spirit of the present invention.

What is claimed is:

1. An engine mount for a vehicle, comprising:
a nozzle plate mounted between an insulator and a diaphragm so as to divide an interior into an upper liquid chamber and a lower liquid chamber, and an annular flow path formed in the nozzle plate so that an encapsulated hydraulic liquid flows between the upper liquid chamber and the lower liquid chamber, the nozzle plate being opened at an upper side of the flow path;
a shielding member which has two or more shielding plates connected so as to be folded or unfolded so that a length of the shielding member is changed, the shielding member being mounted on the nozzle plate so as to cover the upper side of the flow path;
an adjusting bolt which is rotatably mounted in a core coupled to the insulator; and
a connector which has one end connected to the adjusting bolt, and the other end connected to any one of the shielding plates,
wherein the shielding plates are folded or unfolded in accordance with a rotation of the adjusting bolt, and a size of an upper flow path hole, which is formed at one side end of the flow path and communicates with the upper liquid chamber, is determined depending on a state in which the shielding plates are folded or unfolded.

2. The engine mount of claim 1, wherein the shielding member has a shape having a height difference between both sides as a portion of a lower plate of the at least two or more shielding plates having a first catching projection protruding upward at one side end and a portion of an upper plate of the at least two or more shielding plates having a second catching projection protruding downward at the other side end are stacked on each other, and the shielding plates of the shielding member are connected so as to be slidable relative to each other, and connected such that the sliding movement is restricted when the first catching projection comes into direct contact with the second catching projection.

3. The engine mount of claim 2, wherein the connector is connected to the shielding plate closest to the upper flow path hole.

4. The engine mount of claim 3, wherein the connector is made of a material having elasticity.

5. The engine mount of claim 4, wherein the connector has a curved shape so that a curved portion is formed between the adjusting bolt and the shielding plate.

6. The engine mount of claim 1, wherein the nozzle plate includes:
a nozzle lower portion which has an annular flow path groove formed in an upper surface of the nozzle lower portion, and a lower flow path hole formed at one side end of the flow path groove and communicating with the lower liquid chamber; and
a nozzle upper portion which is coupled at an upper side of the nozzle lower portion, and has an upper flow path hole formed at the other side end of the flow path groove and communicating with the upper liquid chamber, and
the shielding member is slidably coupled to the nozzle upper portion so as to be placed on the flow path groove.

7. The engine mount of claim 1, wherein the core has a bolt hole having threads formed on an inner circumferential surface of the bolt hole, the adjusting bolt is thread-coupled into the bolt hole, and a wrench groove is formed at an upper end of the adjusting bolt so that a wrench is fitted into the wrench groove.

8. The engine mount of claim 7, wherein a fixing bolt for coupling an engine bracket is fastened into the bolt hole at an upper side of the adjusting bolt.

* * * * *